Sept. 22, 1970   E. F. KOSSIAN ET AL   3,529,697
COLLAPSIBLE SAW HORSE
Filed May 26, 1969
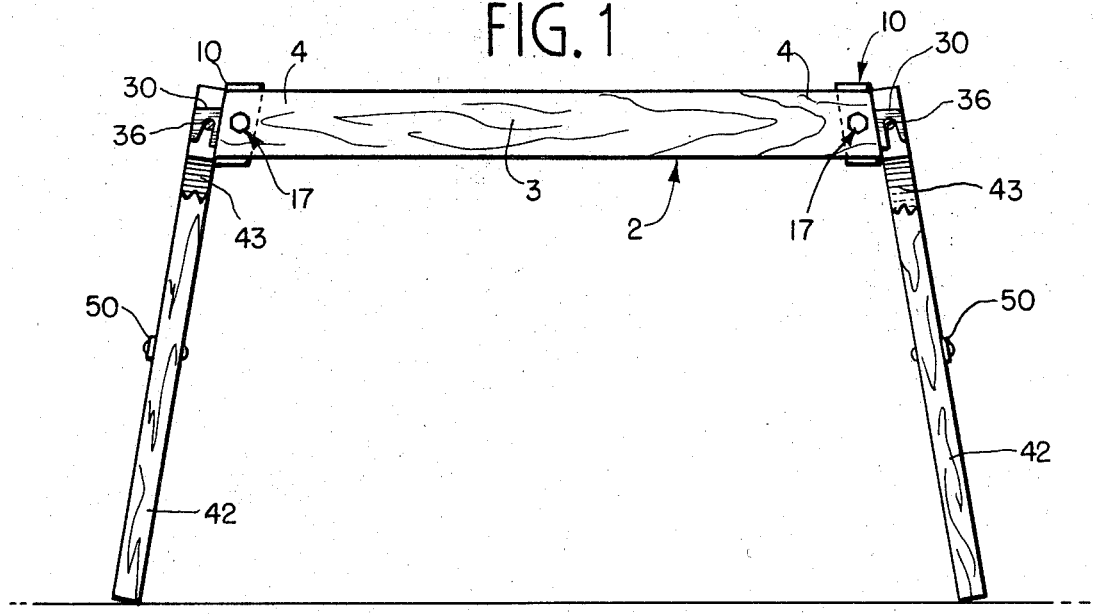
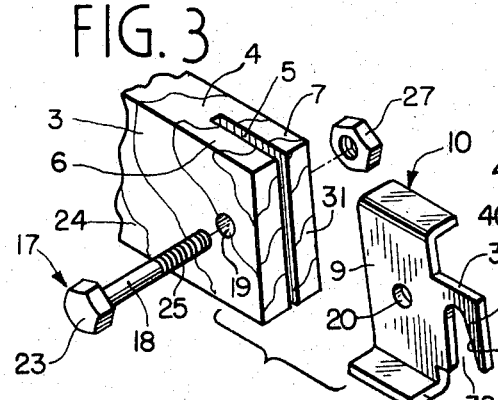
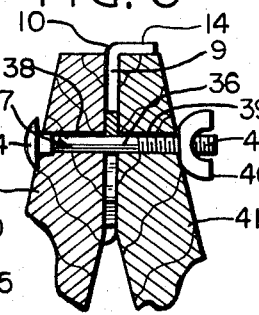
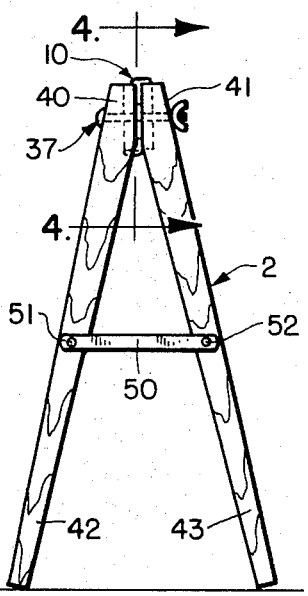
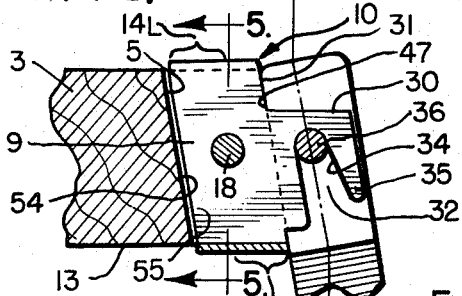
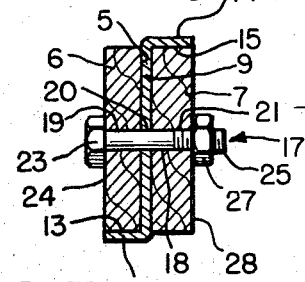
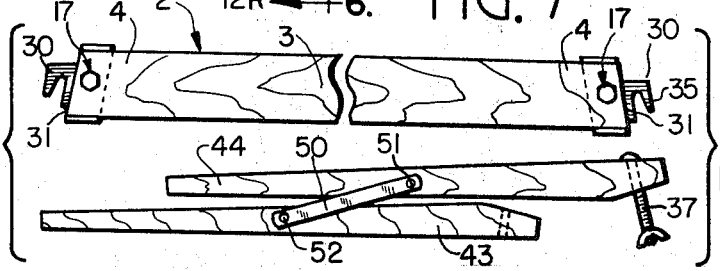
Inventors
Ernest F. Kossian
Frank White
By John J. Kowalik
Attorney United States Patent Office 3,529,697
Patented Sept. 22, 1970

3,529,697
COLLAPSIBLE SAW HORSE
Ernest F. Kossian, 5442 N. Normandy 60656, and Frank White, 620 Surf St. 60657, both of Chicago, Ill.
Filed May 26, 1969, Ser. No. 827,593
Int. Cl. E04g 1/32
U.S. Cl. 182—186                                      10 Claims

ABSTRACT OF THE DISCLOSURE

A saw horse having pairs of upwardly converging foldable legs at each end, a beam extending therebetween, a bracket plate fitted into a kerf at each end of the beam and having upper and lower reaction flanges, the upper flange engaging the top of one furcation and the other flange engaging the underside of the other furcation, the bracket having an extension with a downwardly extending tang presenting an outwardly and downwardly sloping wedge surface converging upwardly with an adjacent end face of the beam for wedging therebetween part of the upper portions of the legs and a portion of a bolt which extends through and draws the upper portions of the legs into tight clamping relation with the extension to develop a tight assembly.

DISCUSSION OF THE PRIOR ART

As best best known to applicants, the structures of the prior art are either too cumbersome to assemble, become loose in use, are too expensive to make, or do not fold for convenient stowage.

SUMMARY OF THE INVENTION

The present invention is directed to a saw horse of collapsible type wherein the parts are so organized that in use they become tighter, but which can be readily loosened without hammering or otherwise forcing the parts to separate.

A general object of the invention is to provide a novel saw horse in which the parts are arranged in self-wedging relationship responsive to normal work loads imposed thereon.

A further object is to devise a novel arrangement of parts in which the connecting parts distribute the loads to between the legs and the interconnecting beam in an optimum manner so as to utilize the maximum strength thereof.

To this end the invention comprehends mounting a bracket at each end of the beam on the neutral axis thereof and so connecting the bracket to the beam as to effect a pivot action of each bracket on the beam such that in pivoting the bracket distributes evenly to both sides of the beam in balanced opposition and any looseness of the pivotal connection enhances the wedging action between the legs and the ends of the beam.

These and other objects and advantages inherent in and encompassed by the invention will become more readily apparent from the specification and the drawings, wherein:

FIG. 1 is a side elevational view partly broken away of the novel collapsible saw horse;

FIG. 2 is an end view thereof;

FIG. 3 is an exploded fragmentary enlarged view of the parts of one end portion thereof;

FIG. 4 is an enlarged vertical sectional view taken substantially on line 4—4 of FIG. 2;

FIG. 5 is a cross sectional view taken substantially on line 5—5 of FIG. 4;

FIG. 6 is a further cross-sectional view taken essentially on line 6—6 of FIG. 4, and FIG. 7 is a view showing the parts collapsed and disassembled.

DESCRIPTION OF THE INVENTION

The saw horse generally designated 2 comprises a top beam 3 of wood, which may be the usual 2" x 4" lumber, has end portions 4, 4 each of which has a vertical kerf 5 sawn therein on the neutral axis of the beam and forming a pair of furcations 6, 7 which snugly admit therebetween in the kerf a vertical flat plate section 9 of a metal bracket 10.

The bracket 10, one at each end of the beam, is generally Z-shaped in cross section as best seen in FIG. 5 and comprises a bottom or lower flange 12 extending normal to the plate section 9 and engaging the bottom edge 13 at the bottom of the furcation 6. An upper flange 14 extends from the upper edge of plate section 9 normal thereto and snugly fits against the top edge or side 15 of furcation 7.

Each bracket 10 is secured to the associated end of the beam by a transverse pin or nut and bolt assembly generally indicated 17 which has a horizontally disposed shank 18 extending through horizontally aligned apertures 19, 20 and 21 provided respectively in furcation 6, plate section 9 and furcation 7 substantially medially between the top and bottom sides of the beam. The shank has a head 23 at one end bearing against side 24 of the beam and the other end of the shank is threaded at 25 and mounts a nut 27 which engages side 28 of the beam. The nut is tightened to draw the furcations tightly together against the intervening plate segment 9. The provision of one bolt 17 obtains a horizontal pivot axis for the bracket which when loaded, as hereinafter detailed, causes the bottom flange to react upwardly and the top flange to react downwardly.

The plate section 10 has an extension 30 which projects beyond the respective end face 31 of the beam and is provided with an inverted V-shaped slot 32 which is defined at its outer edge 34 by a downwardly extending tang 35.

The edge 34, which opposes the adjacent edge 34, slopes upwardly inwardly and forms a wedge which cooperates with the wedge means in the form of a shank 36 of a bolt 37 which extends through transverse aligned apertures 38, 39 in the upper portions 40, 41 in the pair of wooden legs 42, 43. The bolt assembly 37 has a head 44 at one end of shank 36 and a threaded opposite end portion 45 which mounts a wing nut 46.

The end faces 31 of the beam are sloped upwardly and inwardly and converge upwardly at an acute angle. The angle of the wedge face 34 is slightly larger by no more than several degrees than the related face 31 and therefore upon the beam 3 being urged downwardly the flat inner faces 47 of the upper portions 40, 41 of the legs 42, 43 are biased transversely against the respective end face 31 thus effecting a tight connection with attendant slight compression of the wood. The pairs of legs are also sloped upwardly. The bolt assembly 34 is then tightened against upper leg portions clamping the respective end portion therebetween.

It will be further noted that the legs of each pair are interconnected by a strut 50 pivotally connected at one end by a screw 51 to one leg and by screw 52 to the other leg whereby when the legs are disasembled as seen in FIG. 7 they may be folded toward each other.

Another feature of the invention resides in the diagonal shear of the plate section 9. As seen by the section line 5—5 in FIG. 4, the flange 12 has a portion 12R which is longer than portion 12L and flange 14 has portion 14L larger than portion 14R. Thus the maximum amount of metal is positioned in the areas of load considering that plate 10 tends to turn in a counter-clockwise direction (see FIG. 4) as shown by the arrow. Thus the load is on portion 12L to the right of the plane represented by line 5—5 and concurrently portion 14L at the left side of the plane is loaded. The kerf has an inner edge 54 and the plate has an inner edge 55 which slopes downwardly and outwardly.

Thus a novel unitized locking assembly has been provided which is self-tightening and wherein the parts wedge into a tight assembly which may be readily reassembled.

We claim:

1. A collapsible saw horse having a pair of downwardly diverging legs at each end and a top generally horizontal beam therebetween having end portions engaging the respective pairs of legs on their inner sides, means releasably connecting each end portion of the beam to the respective pairs of legs and comprising a metal bracket secured to each end portion, each bracket having a downwardly projecting tang with a wedge surface facing extending transversely of the beam and sloping upwardly toward the adjacent end portion, beam securing means on each pair of legs disposed between the wedge surfaces and the respective end portions of the beam and having wedging engagement therewith, and drawing the legs into tight engagement with the respective end portions of the beam attendant to said beam being urged downwardly thereby tightly locking the beam with the legs.

2. The invention according to claim 1 and said end portions of the beam having a vertical kerf therein, and each bracket having a vertical plate section disposed within the kerf, and means releasably securing the plate to the end portion of the beam.

3. The invention according to claim 2 and said beam having top and bottom sides and a bottom flange extending laterally from the lower edge of the plate section and engaging the bottom side of the beam.

4. The invention according to claim 3 and said plate section having an upper flange extending reversely from the bottom flage and engaging the top side of the beam at one side of the kerf and the lower flange engaging the bottom side of the beam at the opposite side of the kerf.

5. The invention according to claim 4 and said kerf disposed on the neutral axis of the beam and defining a pair of furcations, and a single transverse pin assembly extending through aligned transverse openings in the furcations and plate section accommodating rotation of the bracket about a generally horizontal axis, and said upper flange adapted to load the furcations therebelow downwardly and said lower flange adapted to load the furcation thereabove upwardly attendant to the imposition of a load upon said beam.

6. The invention ccording to claim 5 wherein each bracket has an extension projecting beyond the respective end portion in substantially centered relation between the sides thereof and comprising a downwardly projecting tang having a wedge surface opposing the adjacent end portion of the beam, and wedge means on each pair of legs wedged upwardly between the wedge surface and the adjacent end portion to obtain a tight locking engagement therewith.

7. The invention according to claim 6 and a strut between each pair of legs having a pivotal connection at each end with respective legs, said legs having upper end portions embracing said extension therebetween, and said wedge means comprising a nut and bolt assembly extending through aligned apertures in said upper portions of the legs and adapted to be drawn up to effect tight embracement of the legs with the associated extension.

8. The invention according to claim 7 and said end portions having upwardly converging end surfaces in substantially flat face engagement with the inner sides of the upper portions of respective pairs of legs.

9. The invention according to claim 8 and the wedge surface on each tang and the adjacent end face converging upwardly at a sharp acute angle.

10. The invention according to claim 1 and each end portion having a central vertical kerf therein defining a pair of laterally aligned furcations, each bracket having a vertical plate fitted snugly within the furcation in the associated end portion, and said plate having reversely directed upper and lower flanges, the upper flange bearing against the upper side of the furcation therebelow, and the lower flange bearing against the bottom edge of the furcation thereabove, and a horizontally disposed nut and bolt assembly extending through the plate and furcations and drawing the same tightly together.

References Cited

UNITED STATES PATENTS

| | | | |
|---|---|---|---|
| 978,403 | 12/1910 | Schott | 182—186 |
| 2,343,557 | 3/1944 | Johnson | 182—186 |
| 2,549,212 | 4/1951 | Lane | 182—181 |
| 2,889,177 | 6/1959 | Rambow | 182—186 |
| 2,973,053 | 2/1961 | Beaty | 182—186 |

REINALDO P. MACHADO, Primary Examiner